United States Patent [19]

Smals

[11] Patent Number: 5,076,702

[45] Date of Patent: Dec. 31, 1991

[54] INSTALLATION FOR EXTRACTING GRANULAR MATERIAL IN A PREDETERMINED COMPOSITION, METHOD USING THAT INSTALLATION, A MIXING UNIT, AND MEANS OF MEASURING THE WATER CONTENT OF GRANULAR MATERIAL

[75] Inventor: Michael R. Smals, Herten, Netherlands

[73] Assignee: B.V. Grint - en Zandexploitatie Maatschappij v/h Gebrs. Smals, Netherlands

[21] Appl. No.: 270,344

[22] Filed: Nov. 14, 1988

[30] Foreign Application Priority Data

Nov. 19, 1987 [NL] Netherlands ........................ 8702774

[51] Int. Cl.5 .......................... B01F 5/00; B28C 7/04; G05D 11/04; G01N 23/00

[52] U.S. Cl. .......................................... 366/18; 73/73; 299/9; 366/152; 366/160; 366/337

[58] Field of Search ....................... 366/2, 8, 140, 141, 366/16, 17, 19, 20, 21, 152, 337, 160, 162, 9, 6; 209/239, 315, 316, 317, 12, 13, 17, 18, 44, 237, 906; 222/52, 132, 135, 138, 1, 23, 29, 145; 73/73, 61 R, 863.23; 37/54; 299/7, 9

[56] References Cited

U.S. PATENT DOCUMENTS

| | | | |
|---|---|---|---|
| 395,624 | 1/1889 | Miller | 299/9 |
| 800,480 | 9/1905 | Palmer | 209/17 X |
| 1,590,647 | 6/1926 | Sackett . | |
| 1,704,115 | 3/1929 | Young | 209/17 |
| 1,851,115 | 3/1932 | Smoot | 209/18 |
| 1,864,926 | 6/1932 | Moss et al. | 299/9 |
| 2,105,266 | 1/1938 | Rendall | 366/160 X |
| 2,179,485 | 11/1939 | Avril | 366/337 X |
| 2,300,680 | 11/1942 | Lyons | 299/9 X |
| 2,587,531 | 2/1952 | Saxe . | |
| 2,782,926 | 2/1957 | Saxe | 209/239 X |
| 3,110,421 | 11/1963 | Matthias | 222/57 |
| 3,170,677 | 2/1965 | Phister,Jr. et al. | 366/16 |
| 3,245,584 | 4/1966 | Linville | 222/132 X |
| 3,275,304 | 9/1966 | Brundrett | 366/337 |
| 3,285,580 | 11/1966 | Renaudette | 366/160 |
| 3,348,140 | 10/1967 | Godding | 73/73 X |
| 3,425,552 | 2/1969 | Curtis | 209/239 |
| 3,439,800 | 4/1969 | Tonjes | 209/239 X |
| 3,467,281 | 9/1969 | Archer | 222/132 X |
| 3,631,337 | 12/1971 | MacKinney | 324/65 R |
| 3,661,365 | 5/1972 | Cloud, Jr. | 366/18 |
| 3,869,110 | 3/1975 | Brock et al. . | |
| 3,954,002 | 5/1976 | Grieser et al. | 73/73 X |
| 4,262,429 | 4/1981 | Avril | 34/33 |
| 4,328,093 | 5/1982 | Zrnic et al. | 209/18 X |
| 4,384,787 | 5/1983 | Ito et al. | 366/6 |
| 4,409,096 | 10/1983 | O'Brian | 366/152 X |
| 4,592,155 | 6/1986 | Mustoner | 37/54 |
| 4,685,742 | 8/1987 | Moreau | 299/9 X |
| 4,686,852 | 8/1987 | Ito et al. | 73/73 X |
| 4,758,098 | 7/1988 | Meyer | 366/337 |
| 4,786,182 | 11/1988 | Larsen | 366/140 |

FOREIGN PATENT DOCUMENTS

| | | | |
|---|---|---|---|
| 1042447 | 10/1958 | Fed. Rep. of Germany . | |
| 1921681 | 11/1970 | Fed. Rep. of Germany . | |
| 1326565 | 8/1973 | United Kingdom . | |
| 2048699 | 12/1980 | United Kingdom . | |
| 2115303 | 9/1983 | United Kingdom | 366/152 |

*Primary Examiner*—Harvey C. Hornsby
*Assistant Examiner*—Scott J. Haugland
*Attorney, Agent, or Firm*—Watson, Cole, Grindle & Watson

[57] ABSTRACT

A floating vessel which can move about a sand pit mounts apparatus for gathering granular material at the bottom of the sand pit, for processing the granular material into a mixture of a desired granular composition, and for delivery to a barge which can transport the granular material mixture to an ultimate user.

6 Claims, 5 Drawing Sheets

INSTALLATION FOR EXTRACTING GRANULAR MATERIAL IN A PREDETERMINED COMPOSITION, METHOD USING THAT INSTALLATION, A MIXING UNIT, AND MEANS OF MEASURING THE WATER CONTENT OF GRANULAR MATERIAL

BACKGROUND AND SUMMARY OF THE INVENTION

At present granular material, especially sand, is processed and separated into classes at the place of further processing of such granular material.

In U.S. Pat. No. 2,587,531 sampling of sand and separation thereafter into classes is disclosed.

U.S. Pat. No. 3,631,337 and 4,262,429 relates to drying of granular material.

It is an object of the present invention to improve upon the mentioned prior art.

It is another object to provide an installation for the extraction of granular material, which delivers such granular material in a desired composition to a transport means for transporting the granular material.

Further, the present invention provides a passive mixing unit for thoroughly mixing granular material, which uses little power and requires little service, as the mixing unit has no moving parts whatsoever.

It is preferred that the mixing unit is utilized in the noted installation for the extraction of granular material, as this mixing unit provides thorough mixing, which is required before taking samples of the mixture.

Further, the present invention provides a method and means for measuring the water content in granular material, which provides the exact content of so-called "dry material" of the mixture of water and granular material and therefor the value of this mixture.

Further features, advantages and details will be understood by reading the ensuing description, in which embodiments of the present invention are disclosed and in which refers to the annexed drawing.

DETAILED DESCRIPTION OF THE PREFERRED EMBODIMENTS

FIG. 1 a perspective top view of an installation according to the present invention floating one the water in a sand pit;

FIG. 2 a diagram of the operation of the installation of FIG. 1;

FIG. 3 a schematic view of detail III of FIG. 2;

FIG. 4 a perspective view, partly broken-away of detail IV of FIG. 2;

FIG. 5 a perspective side view of detail V of FIG. 4;

DETAILED DESCRIPTION OF THE PREFERRED EMBODIMENTS

Figure 1:
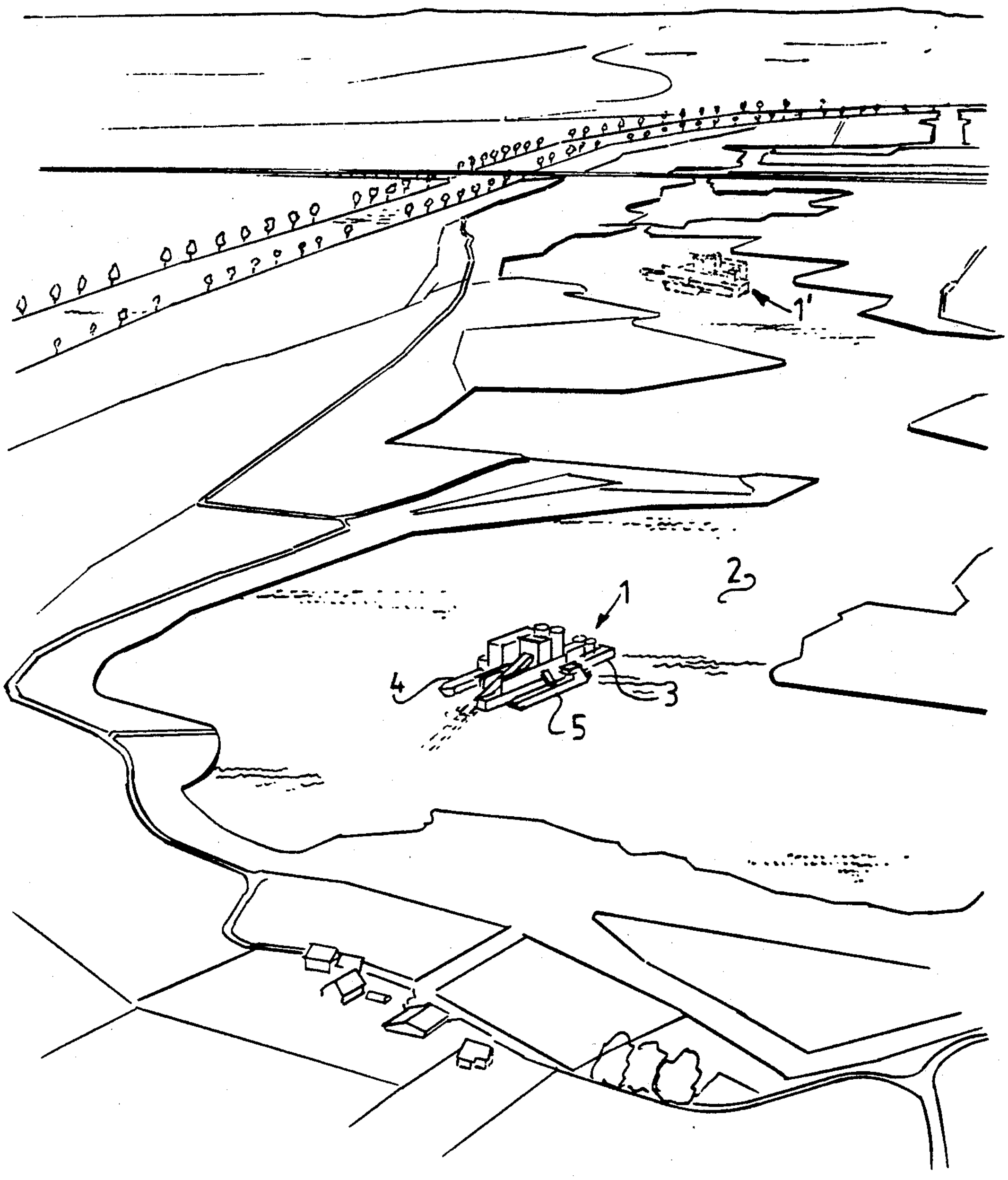

An installation 1 (FIG. 1) for the extraction of sand from a sand pit 2 according to the present invention is preferably provided with floats pontoons 3, such that the installation 1 can easily be moved (e.g. with the aid of a tugboat, not shown) through-out the sand pit 2, as indicated by 1'. Preferably, the movement of the installation takes place with the aid of winches mounted on board and lines to be brought out to the shore. The position of the installation can in some situations be dependant on the sort of sand or gravel required, although this generally varies little or not at all over the bed of the sand pit 2. Sand and gravel can be carried off by barges 4, 5, respectively.

Figure 2:
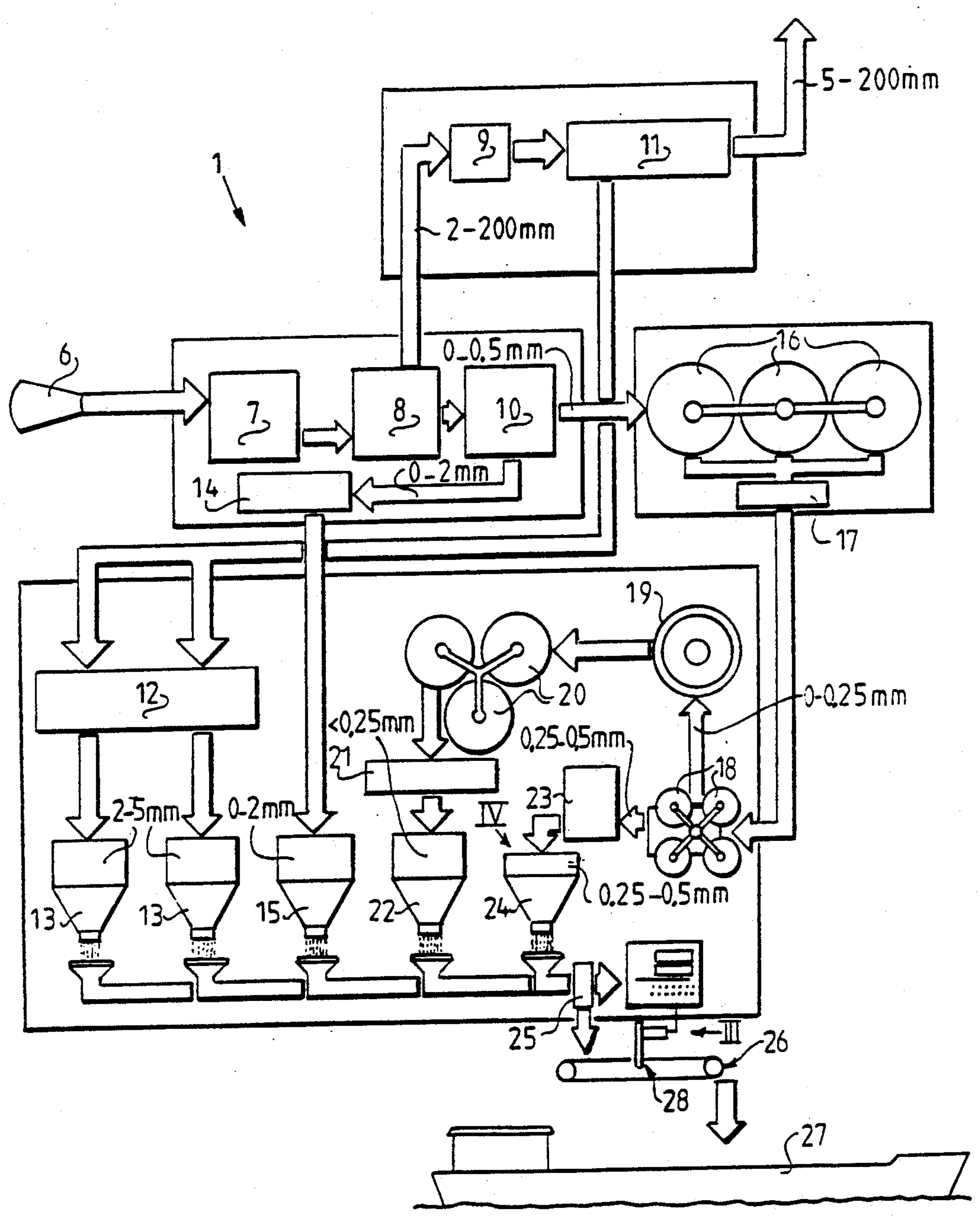

A stream of granular material, in the illustrated embodiment sand and gravel, sucked up using a pump 7 through a suction orifice 6 (FIG. 2), is separated by a classifier 8 into a fraction with a grain size between 2 and 200 mm (gravel) which is bunkered in bunker 9, and a fraction with a grain size between 0 and 2 mm which is washed at washing unit 10. The coarse fraction is further classified in classifying unit 11, whereby the gravel of grain size 5 to 200 mm is carried off for example by barge to a gravel processing installation. The remaining fraction with a grain size of 2 to 5 mm is stored, passing through a washing unit 12, stored for example in two silos 13.

Through the washing process (10), a fraction of grain size from 0 to 2 mm is separated out, which is stored after an elevator dewatering treatment unit 14 in a silo 15. A fraction with a grain size of 0 to 0.5 mm is separated into two fractions in a process through fluidization tanks 16, a pump 17 and fluidization tanks 18; the one fraction (with a grain size of 0 to 0.25 mm) is stored via a pump 19, fluidization tanks 20 and dewatering screen 21 in a silo 22, while the fraction with a grain size of 0.25 to 0.5 mm is stored via a dewatering screen 23 in a silo 24.

Not shown dosing conveyors equipped with weight meters are arranged between the mixer unit 25 and the silos 13, 15, 22 and 24.

The silos 13, 15, 22 and 24 are each provided with a remotely controllable valve so that a stream of sand of the appropriate class can be transferred at a greater or lesser rate through mixing unit 25 and conveyor 26 into a barge 27.

It has been found, particularly in the concrete industry, that it is of very great importance to know the exact composition of the sand which is supplied to the manufacturing process, i.e. the failure rate in the hardening of prefabricated concrete components may for example be 10%, which can be blamed to a large extent on an unsuitable and unknown composition of the sand. According to the present invention it becomes possible to establish the composition of the granular material to be deposited in the barge 27 as required by the manufacturer, and thus to allow the composition of the material to be determined by the end user, diminishing the influence of dealers who see no advantage in delivering sand of exactly defined composition.

In the case of sand, the predictability of the strength and quality of concrete made with the sand is hence accurately determined.

Figure 3:
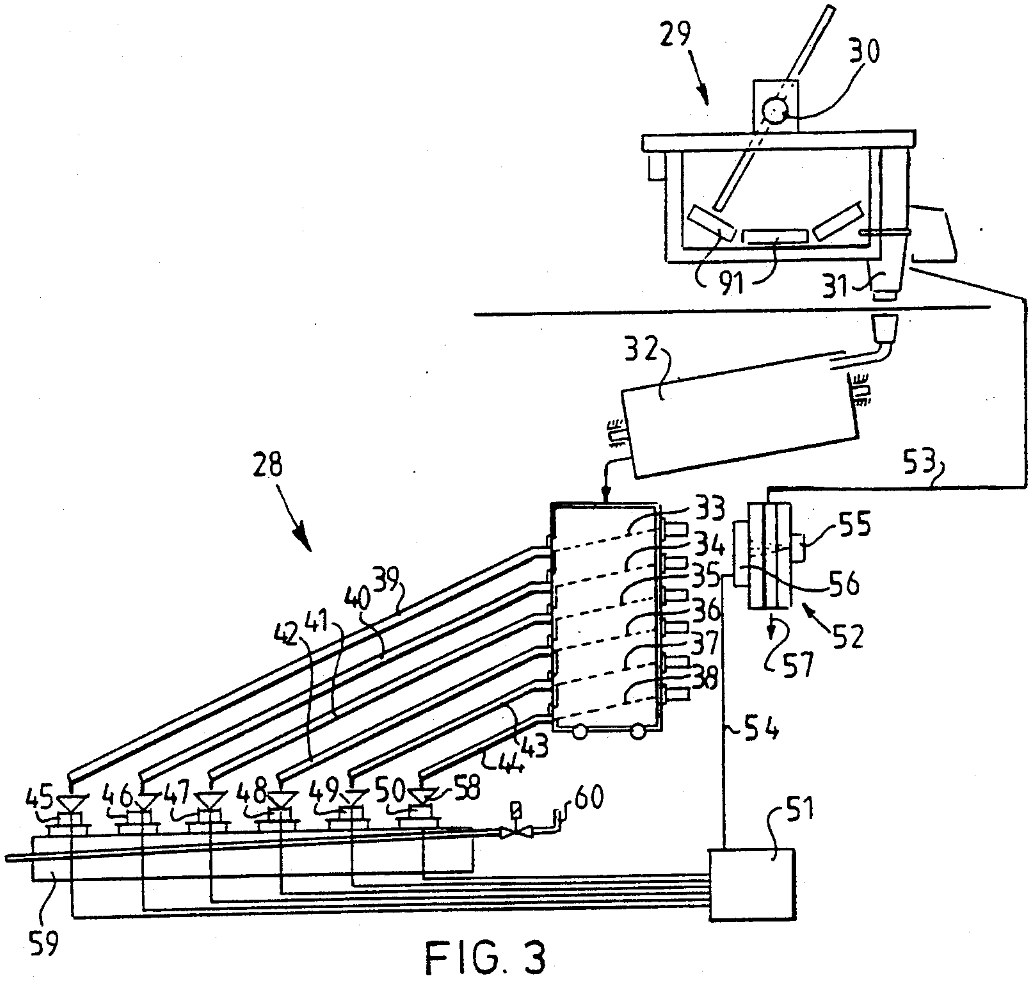

To that end, the installation 1 is provided with sampling means (FIG. 3). A hammer sampling device 29 takes a sample of granular material from a belt conveyor 91 by means of scoops or buckets mounted on a continually or intermittently rotating shaft 30, the sample being transferred via a conduit 31 and dried in a drying unit 32, while a large part of the material is carried off via conduit 53. Drying unit or drying drum 32 is for example provided with infrared elements for drying the granular material, in this case sand. The sand passes out of the dryer 32 onto sloping sieves 33–38, which can be set into vibration and are coupled to similarly vibratable chutes 39–44. The sieves 33–38 have successively narrower mesh sizes, so that the finest sand arrives at weighing means 50 while the coarsest sand grains arrive at weighing means 45. At moments determined by a control unit 51, for example a computer control, the quantity of sand collected in the weighing means 45–50 is weighed. Mesh sizes of the sieves 33–38 are preferably such that the sand is distributed over the weighing elements 45–50 in normalized classes. These classes covering a different size range than those stocked in the silos 13, 15, 22 and 24. This sand in normalized classes is, as mentioned above, of great importance to the concrete industry.

Connected to the control unit 51 is also a measuring unit 52 for determining the moisture content of the sand that is likewise extracted by means of the sampling device 29 and carried into the measuring unit via conduit 53. In this manner a value for the water content of the sand becomes available to the control unit 51 via a line 54, so that the quantity of dry substance per sample is determined.

The measuring unit 52 comprises preferably a neutron source 55 and a radiation detector 56, which detects the quantity of neutron radiation absorbed by the water molecules in the sand/water mixture. The discharge of the sand (arrow 57) will generally take place intermittently under the automatic control of the control unit 51. The readings of the previously mentioned weight meters on the dosing belts is also of importance in this respect. It is noted that the measuring unit for determining the moisture content can be embodied in different forms. A radiation source and a radiation detector or a measuring unit in another embodiment, can e.g., be arranged near conveyor 91.

Buckets 58 of the weighing units 45–50 are preferably tiltable, so that they can be (automatically) emptied into a trough 59 which can be flushed by means of a flushing pipe 60.

Figure 4:
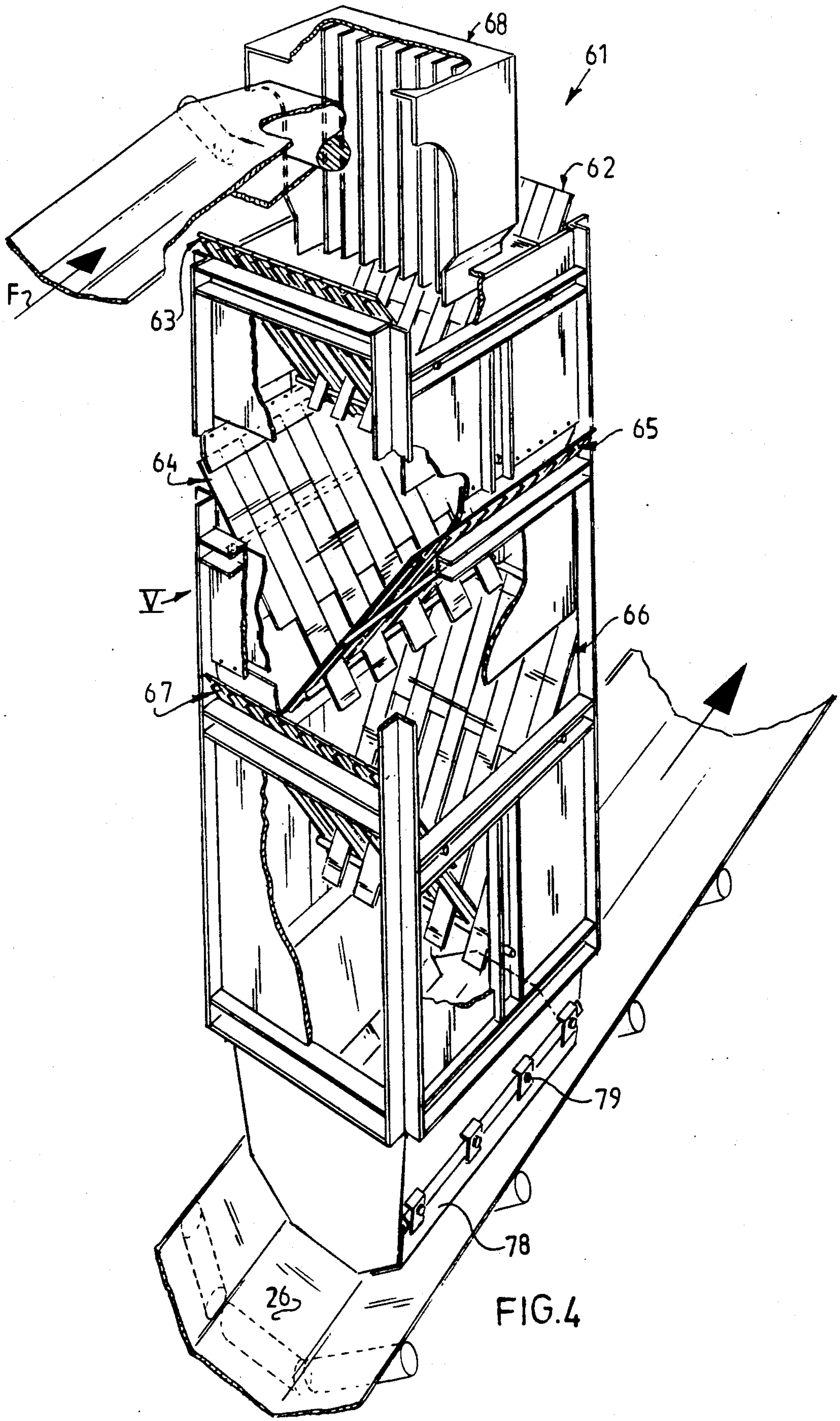

Prior to the bringing of the sand from the silos 13, 15, 22 and 24 onto the conveyor 26 (FIGS. 2, 4), the granular material is preferably carried into a passive mixing unit 61, which comprises three pairs of interpenetrating slatted constructions 62, 63, 64, 65, 66, 67, successive pairs being rotated through 90° relative to one another. The granular material or sand supplied via arrow F falls, after possibly impinging upon deflector 68, downwards between slats 62, 63, 64, 65 and 66, 67, and arrives finally on conveyor 26. Tests have shown that - a (virtually) complete mixing of the various fractions is obtained.

Figure 5:
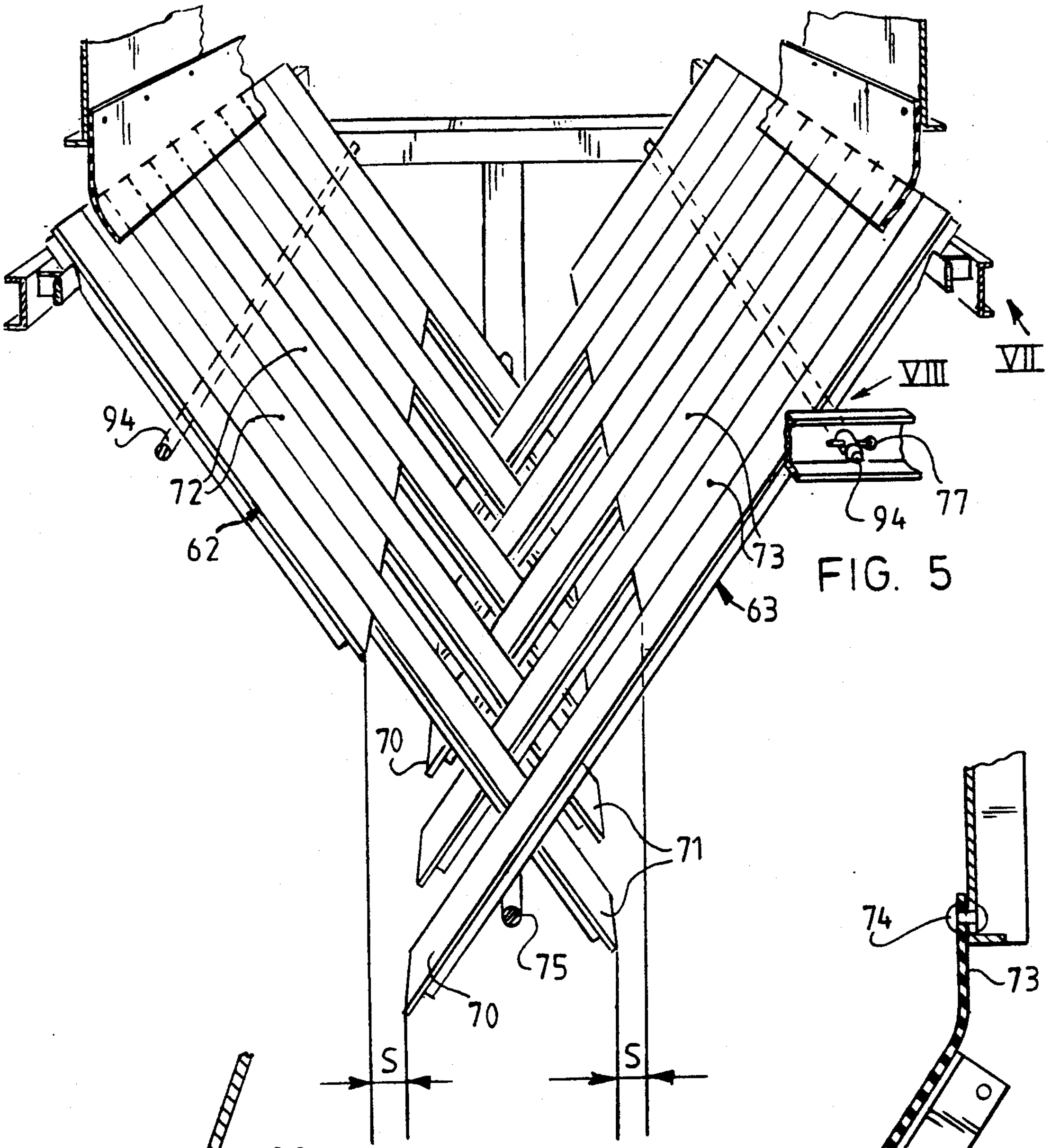

In greater detail (FIG. 5), it can be seen that gaps S through which the sand can fall downward and which are preferably disposed in a plane transverse to the direction of fall, are repeatedly left open between projecting slats 70, 71 and the retreating parts 72 and 73 respectively of slat units 62 and 63.

Figure 6:
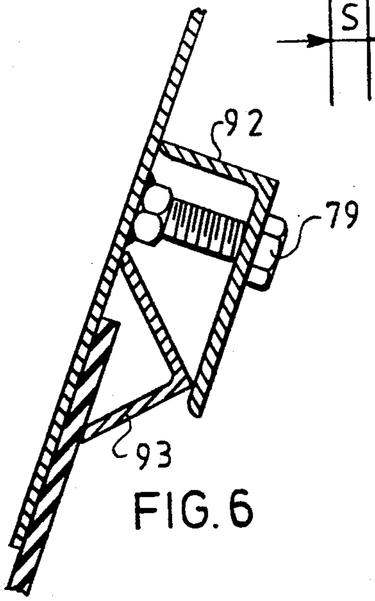
FIG. 6 is a view of detail VI of FIG. 4.
Figure 7:
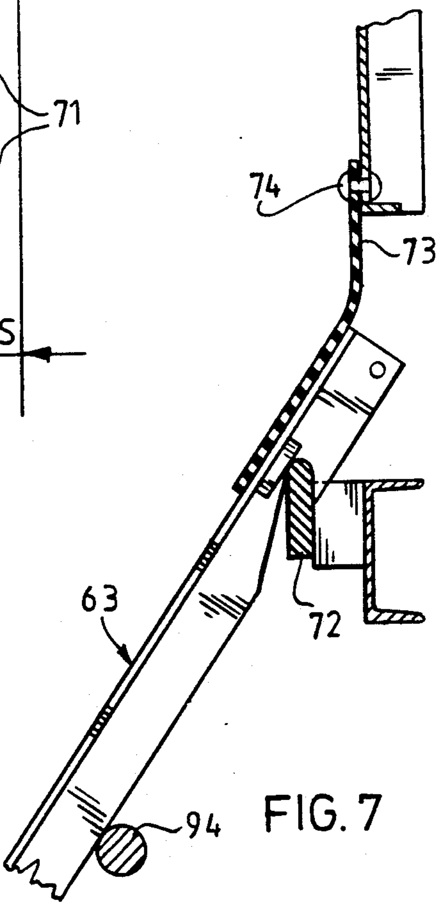
FIG. 7 is a view of detail VII of FIG. 5.
Figure 8:
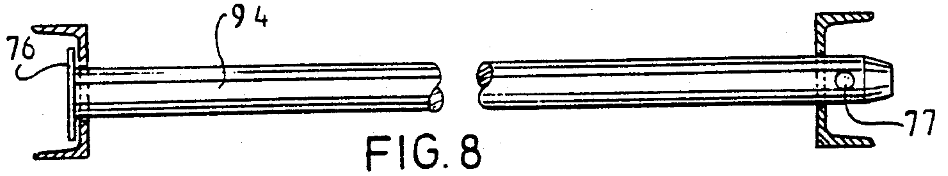
FIG. 8 is a view of detail VIII of FIG. 5.

As can be seen from the details in FIGS. 6, 7 and 8, the slat units 62, 63 and therefore the mixing unit 61 are easily renewable, since the slat units can be lifted away from a support 72 after a piece of flexible material 73 has been detached from pin 74; the slat units 63 and 62 rest on a common support bar 75, and also on support bars 94 which are provided at one end with a plate 76 (FIG. 8) and at the other with a split pin 77. The bottom part 78 of the mixing unit 61 (FIG. 4) is mounted through angle member 92 and angle pieces 93 by means of bolts 79.

Figure 9:
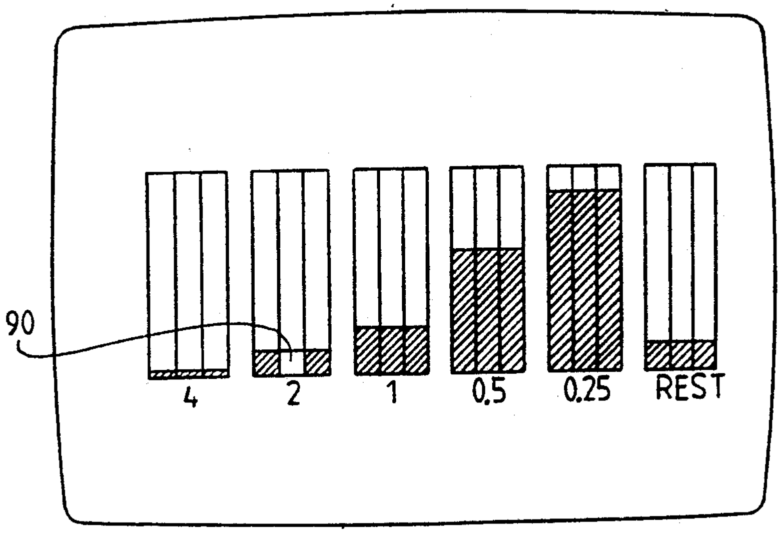
FIG. 9 is a view of a visualized registration of the composition of a mixture of granular material.

Finally FIG. 9 illustrates the composition of the readings obtained using the above-described sampling process. The normalized grain size classes are: larger than 4 mm, 2–4 mm, 1–2 mm, 0.5–1 mm, 0.25–0.5 mm and finer than 0.25 mm. The preset boundary values between which the respective fractions must be situated are indicated by the bars on the left of the corresponding columns in FIG. 9. The differently coloured column 90 indicates that the quantity of sand present at the standard diameter 2 mm falls outside the preset range, so that the valve of silo 15 has to be adjusted either by hand or automatically.

A barge calling at the installation according to the invention preferably delivers a card or key, programmed for example by a concrete manufacturer, which card or key is inserted into the control unit 51, which in turn delivers sand in the composition recognizable by the control unit in that card or key.

This automatically controlled installation is the preferred embodiment of the present invention. However, by means of the visualized readings of FIG. 9, disposed near the operator of the installation, where also the operating buttons or handles for the remote control are provided, the remote control can also be achieved by the operator manually with a certain accuracy.

The present invention is not restricted to a floating installation, since in certain circumstances a construction on the shore will prove quite feasible.

For the purposes of calibration, fractions of a known grain size can be passed through the installation in both a dry and a wet condition. By this means the sampling unit, the filtering unit and the moisture content unit can be accurately calibrated.

I claim:

1. A movable installation that comprises a floating vessel and an apparatus mounted on the floating vessel for the gathering of granular material at a sand pit, the processing of the granular material into a granular material mixture of a desired granular composition, and the delivery of the granular material mixture to a transport means, said apparatus comprising:

gathering means for gathering granular material at a site where said movable installation has moved and where granular material is present, sorting means for sorting all of the gathering granular material into a plurality of granular fractions of differing size distributions, mixing means for mixing controlled amounts of said fractions and forming a granular material mixture of desired granular composition, feeding means for feeding controlled amounts of said granular fractions to said mixing means, delivery means for delivering said granular material mixture of desired granular composition to a transport means, said delivery means comprising a conveyor belt having an upper surface, sampling means for taking samples of said mixture of granular material, said sampling means comprising a device mounted for swinging movement to remove granular material from said upper surface of said conveyor belt, separating means for separating said samples into portions of predetermined granular dimensions, determining means for determining the quantity of granular material in said portions, and control means operatively connected with said determining means and said feeding means to control the amounts of granular material fed from said granular fractions to provide said granular material mixture of desired composition.

2. A movable installation as defined in claim 1 wherein said determining means includes means for weighing the granular material of each of said portions.

3. A movable installation as defined in claim 1 wherein said mixing means includes fixed deflecting means for deflecting and mixing granular material, said deflecting means being positioned to engage the granular material as the material drops thereon under the influence of gravity.

4. A movable installation as defined in claim 1 wherein said sampling means includes drying means for drying the granular material before determining the quantity of granular material in said portions.

5. A movable installation as defined in claim 1 wherein said sampling means includes measuring means for measuring the water content of the granular material.

6. A movable installation according to claim 1, wherein said floating vessel includes pontoons.

* * * * *